Figure 4:
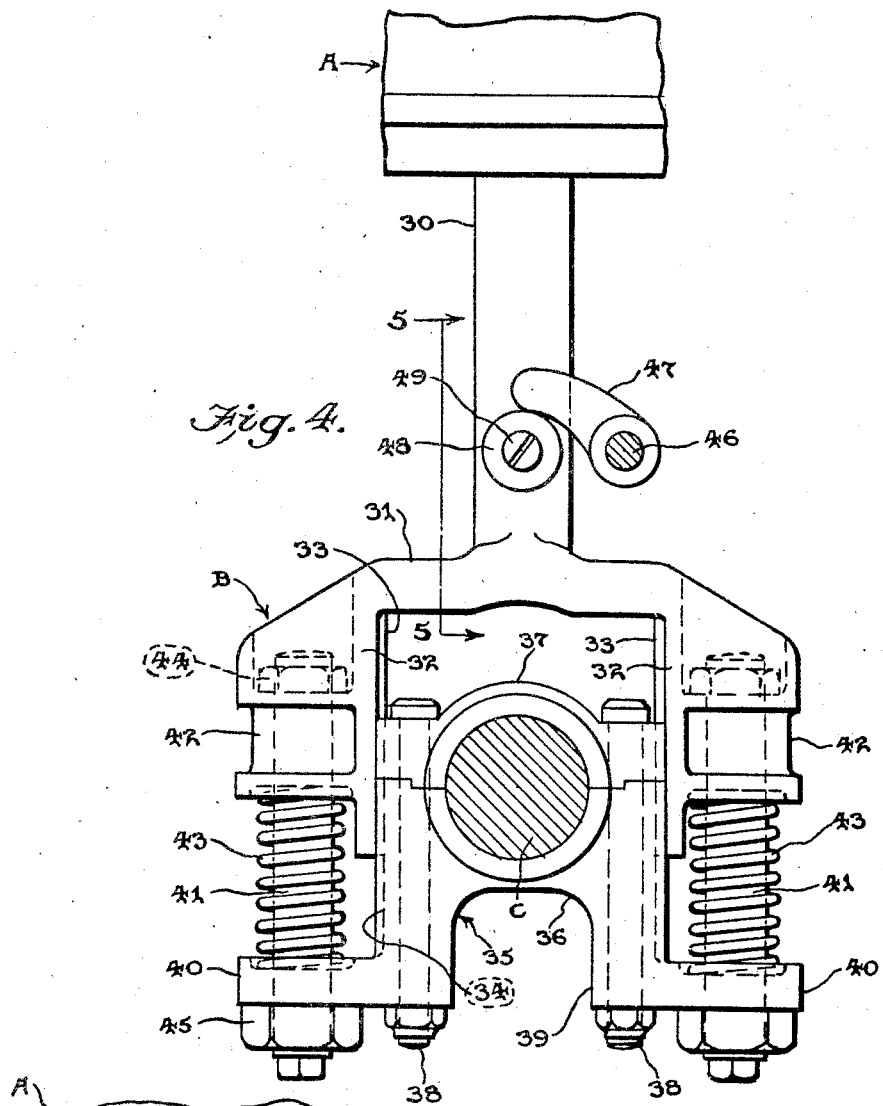

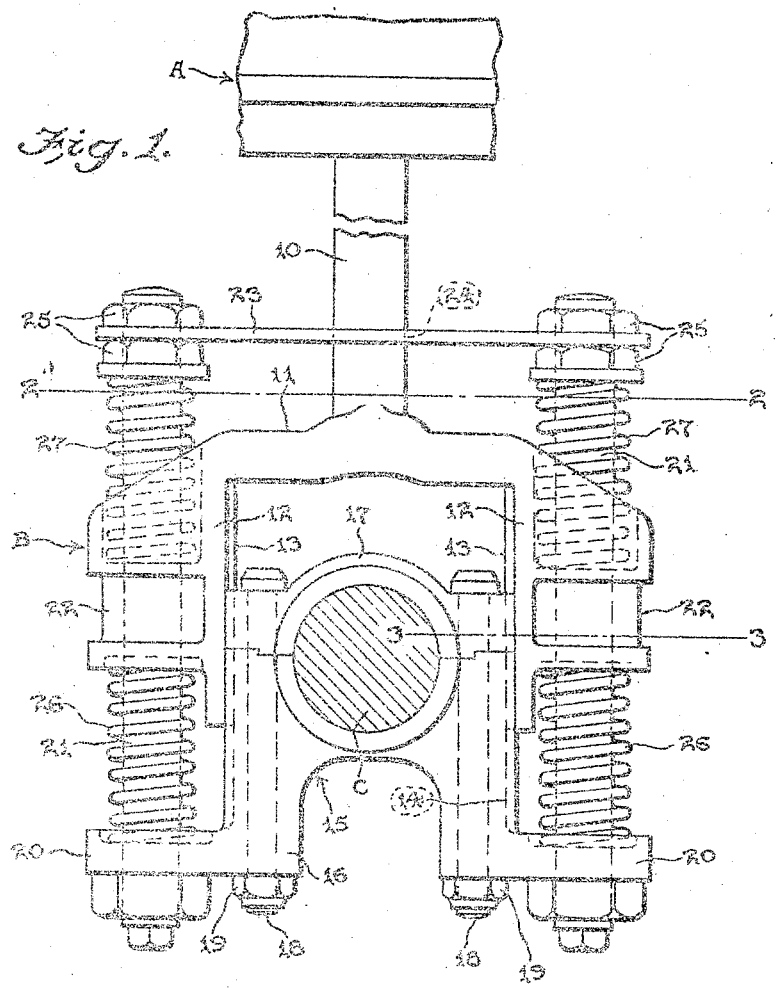
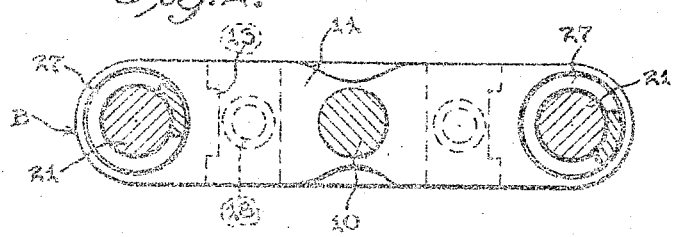
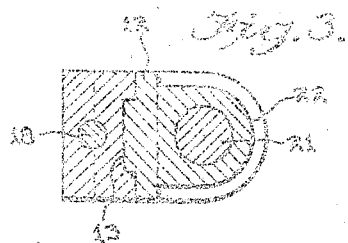

Dec. 8, 1931.  A. SCHWARZ  1,835,096
INTERNAL COMBUSTION ENGINE
Filed March 1, 1930    2 Sheets-Sheet 2

Inventor
Alfred Schwarz,
By
M. M. Weisman
Attorney.

Patented Dec. 8, 1931

1,835,096

UNITED STATES PATENT OFFICE

ALFRED SCHWARZ, OF UPPER MONTCLAIR, NEW JERSEY, ASSIGNOR, BY MESNE ASSIGNMENTS, TO HOLLOYT MOTORS CORPORATION, OF NEW YORK, N. Y., A CORPORATION OF DELAWARE

INTERNAL COMBUSTION ENGINE

Application filed March 1, 1930. Serial No. 432,478.

This invention relates to new and useful improvements in internal combustion engines.

In my co-pending application for internal combustion engines, Serial Number 418,094, filed January 2, 1930, I have disclosed several devices capable of increasing the thermal efficiency of an engine by maintaining mean effective pressure during a longer period of time for each complete cycle and by avoiding excessive initial pressure at the ignition period. These devices may be arranged in two groups, the first of which includes a main power piston and an auxiliary piston oppositely disposed with respect to the power piston, the said auxiliary piston being either positively operated by mechanism driven in suitable timed relation to the movements of the main piston or operated by the movements of the main piston, while the second group includes a single piston which is connected to a crank shaft by suitable means which will permit relative movement of the piston with respect to said shaft. The present invention is partly a division of the aforementioned application and partly a continuation in part. For this reason, the primary object of this invention is to provide an engine which will operate with a very high thermal efficiency.

A further object of the invention is to increase the thermal efficiency of an internal combustion engine by providing an effective pressure which will not be excessive at its maximum and will be maintained for a longer period of time in order to complete combustion and restrict the fire to but a portion of the entire power or firing stroke of the piston.

Another object of the invention is to provide an internal combustion engine with suitable mechanism which will maintain relatively high pressures for a material length of time during the power stroke of the piston in order to accomplish complete combustion and still avoid detonation, the said mechanism achieving a cushioning of the explosion at its maximum pressures by permitting greater explosion of the gases during the period when the piston is at the top of the ignition or power stroke of the engine where the piston speed is very low and by maintaining the pressure constant or nearly constant during a portion of the downward power stroke of the piston whereby complete combustion is accomplished.

Still another object of the invention is to convert nearly all of the heat units generated during the combustion of the fuel into kinetic energy and thereby minimize the heating of the engine and the artificial cooling necessary to maintain an efficient running temperature.

An additional object of the invention is to provide an internal combustion engine, having a power piston of a conventional type, that is one which is reciprocated within a cylinder during the various strokes of a complete cycle, with mechanism which will maintain mean effective pressure for a longer period of time and which will avoid excessive initial pressure.

Figure 5:
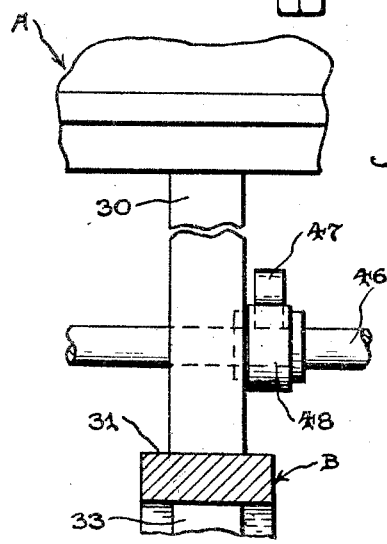

Other objects and advantages of the invention will be apparent during the course of the following description:

In the accompanying drawings forming a part of this specification and in which like numerals are employed to designate like parts throughout the same, Figure 1 is an elevational view, partly in section of a portion of an internal combustion engine embodying this invention, Figure 2 is a transverse sectional view taken on line 2—2 of Fig. 1, Figure 3 is a sectional view taken on line 3—3 of Fig. 1, Figure 4 is a similar view to Fig. 1 but discloses a modified form of the invention, and Figure 5 is a sectional view taken on line 5—5 of Fig. 4.

For the purpose of enabling one skilled in the art to quickly arrive at a general understanding of the mechanism embodying this invention and the operation of the same, the two different forms of devices disclosed best in Figs. 1 and 4 will be described as follows:

Each device discloses a piston A of conventional form, and which constitutes the main or power piston of a complete engine assembly. Portions of the engine not material to a complete disclosure of this invention have been omitted for the sake of brevity. Associated with each piston is a connecting rod structure B by means of which the piston is attached to a crank shaft C. During the normal operation of the crank shaft, the piston A is reciprocated within a cylinder, not shown, to provide the desired number of strokes per cycle. It is believed that this form of mechanism is best adapted for the four stroke cycle type of engine, although I do not desire to be limited to such a use. The connecting rod structure B permits relative movement of the piston A with respect to the crank C either in accordance with certain pressure conditions created in the combustion chamber or in accordance with the timed movement of an actuating mechanism whereby a mean effective pressure may be maintained during a longer period of time for each complete cycle to avoid excessive initial pressure at the ignition period in order to complete combustion and restrict the fire to but a portion of the entire power or firing stroke of the piston.

For the purpose of making a more complete disclosure of the two different forms of the invention, a detailed description of each now will be given:

Referring first to the form disclosed in Figs. 1 to 3, inclusive, the piston A is provided with a connecting rod 10 which is forked or bifurcated at 11 to form the parallel branches 12. The inner longitudinal edges of these branches are provided with ribs 13 which are received within grooves 14 formed in the longitudinal sides of the two-part bearing structure 15 connected directly to the crank shaft C. The lower part 16 of this bearing member 15 is connected to the upper part 17 by means of bolts 18 which extend through suitable holes formed in portions of said parts. These bolts have threaded thereon nuts 19 by means of which the bearing parts are retained tightly drawn together. The rib and groove connection between the forked or bifurcated end 11 of the connecting rod and the bearing member 15 permits of sliding guided relative movement between the bearing structure and the piston rod.

The depending end portions of the lower part 16 of the bearing are provided with horizontally or laterally extending feet 20 which have extending therethrough rods 21. These rods also slidably extend through bearing portions 22 formed on the lower ends of the branches 12 of the connecting rod. The upper ends of the bolts 21 pass through a brace 23 which is suitably apertured at 24 to receive the connecting rod 10. The bolts are connected to the brace 23 by means of adjusting nuts 25 which function to adjustably tension spring means about to be described.

Encircling the bolts 21 between the feet 20 and the bearing portions 22 are springs 26 which are maintained under compression by a second set of springs 27 which encircle the bolts 21 between the bearing portions 22 and the adjustable nuts 25. These springs 26 and 27 work in opposition to each other and are balanced or adjusted so as to maintain the piston A in a normal relative position with respect to the crank shaft C.

It is to be understood that during the normal operation of the crank shaft C, the piston will be reciprocated within its cylinder. During the upward compression stroke of the piston, no relative movement occurs between the piston and crank shaft. Upon reaching the limit of its upward movement, the ignition period occurs and the charge of fuel is exploded. The springs 26 will be of sufficient strength or under proper compression to permit the piston to move downwardly relative to the crank shaft C at the time of explosion and consequently the period of maximum pressure to produce a desired mean effective pressure. During the movement of the crank shaft which normally would result in the initial portion of the downward movement of the piston on the power stroke, the piston A will remain substantially stationary for the purpose of maintaining this mean effective pressure for a greater length of time. As the crank continues its movement, the springs 26 will expand until balanced by the springs 27 when the movement of the crank C will be directly conveyed to the piston A and the latter will assume its normal downward movement under the influence of the expanding gases in the combustion chamber.

It therefore will be seen that the springs 26 and 27 will permit the piston A to move under the influence of the expanding gases at the time of ignition to reduce the maximum pressure to a desired mean effective pressure and these compression springs will otherwise function to maintain the piston A at its normal relative position with respect to the crank shaft C.

In the form of the invention shown in Figs. 4 and 5, the piston A is provided with a connecting rod 30 which is forked or bifurcated at its lower end 31 to form the branches 32. These depending branches have their inner edges formed with ribs 33 which are received within grooves 34 formed in the outer sides of the bearing portion 35 which is connected to the crank C. This bearing 35 is provided with a lower part 36 and an upper part 37, the said parts being connected by bolts 38.

The depending side portions 39 have laterally projecting feet 40 through which pass the bolts 41. The upper ends of these bolts are slidably received within bearing portions 42 formed on the branches 32 of the connecting rod 30. Compression springs 43 encircle the bolts 41 and are interposed between the feet 40 and the bearing portions 42. Suitable nuts 44 and 45 are connected to the opposite ends of the bolts 41 and function to vary the tension on the springs 43.

A cam shaft 46 is intended to be mounted in suitable bearings, not shown, so that it will be arranged in parallelism with the axis of rotation of the crank shaft C. This cam shaft 46 is provided with any desired form of cam arm 47 which engages a cam roller 48 loosely connected to the connecting rod 30 by means of a screw, or the like, 49.

During the normal operation of the crank shaft, the piston A will be moved upwardly within the cylinder surrounding the same to compress the fuel mixture fed into the combustion chamber above the piston. Upon the arrival of the piston at its upward limit of movement, the firing of the compressed fuel occurs and the maximum pressure within the combustion chamber is created. For the purpose of reducing this maximum pressure to a desired mean effective pressure, the cam arm 47 of the cam shaft 46, which is operated in suitable timed relation with respect to the rotation of the crank shaft C, engages the cam roller 48 for causing relative downward movement of the piston A with respect to the crank shaft C. This relative downward movement of the piston causes the springs 43 to be compressed beyond their normal state of compression. As the crank continues to rotate, the degree of compression of the springs 43 will be reduced until the bolts 44 and 45 engage their associated surfaces of the bearing and connecting rod when the piston A will move downwardly with the crank C in accordance with the normal movement of a piston during the power stroke. This downward movement of the piston carries the cam roller 48 away from the cam arm 47 and the said cam arm preferably will not again engage the cam roller 48 until the ignition period recurs.

Cam 47 acts as a back stop, keeping the piston from going higher than the limit imposed upon it by the cam. The movement of the connecting rod at various angles is easily taken care of by simply shaping the underside of cam 47 to conform with the circular movement of the crank, as shown in Fig. 4. Only the underside of the cam contacts with roller 48 and only for the top part of the stroke. The connecting rod moves in the direction of cam shaft 46 or to the right in the illustration of Fig. 4.

It is believed that a complete understanding now will be had of the detail features of construction disclosed in the various figures and the manner in which the two forms of the invention will operate.

It is to be understood that the forms of this invention herewith shown and described are to be taken as preferred examples of the same, and that various changes in the shape, size, and arrangement of parts may be resorted to without departing from the spirit of the invention or the scope of the subjoined claims.

Having thus described the invention, I claim:

1. An internal combustion engine including a crank shaft, a bearing structure connected to the crank shaft, a piston, a connecting rod for the piston, said connecting rod having a forked end, and yieldable means interposed between said forked end and the bearing structure for connecting the connecting rod and the crank shaft.

2. An internal combustion engine including a piston, a connecting rod for the piston, a forked end on said connecting rod, a crank shaft, a bearing structure mounted on the crank shaft, rib and groove guiding means between said forked end and the bearing structure, and spring means interposed between the said forked end and the bearing structure.

3. An internal combustion engine including a crank shaft, a bearing structure connected to the crank shaft, a piston, a connecting rod for the piston, said connecting rod having a forked end, yieldable means interposed between said forked end and the bearing structure for connecting the connecting rod and the crank shaft, and cam means for causing relative movement between the piston and the crank shaft.

4. An internal combustion engine including a piston, a connecting rod for the piston, a forked end on said connecting rod, a crank shaft, a bearing structure mounted on the crank shaft, rib and groove guiding means between said forked end and the bearing structure, spring means interposed between the said forked end and the bearing structure, and cam means for causing relative movement between the piston and the crank shaft.

5. An internal combustion engine including a piston, a crank shaft, a connecting rod for the piston, a bearing structure for the crank shaft, yieldable means interposed between the connecting rod and the bearing structure, a cam shaft arranged in parallelism with the axis of rotation of the crank shaft, a cam arm on said cam shaft, and a cam roller mounted on the connecting rod and engageable by the cam arm for causing relative movement of the piston with respect to the crank shaft during certain portions of a complete cycle of operation.

In testimony whereof, I affix my signature.
ALFRED SCHWARZ.